(12) United States Patent
Troy

(10) Patent No.: US 7,490,681 B2
(45) Date of Patent: Feb. 17, 2009

(54) ROBOTIC ROLLING VEHICLE APPARATUS AND METHOD

(75) Inventor: James J. Troy, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/951,728

(22) Filed: Dec. 6, 2007

(65) Prior Publication Data
US 2008/0083571 A1 Apr. 10, 2008

Related U.S. Application Data

(62) Division of application No. 11/538,182, filed on Oct. 3, 2005, now Pat. No. 7,434,638, which is a division of application No. 10/981,912, filed on Nov. 4, 2004, now Pat. No. 7,165,637.

(51) Int. Cl.
*B25J 5/00* (2006.01)
(52) U.S. Cl. .............................. 180/8.1; 180/8.4; 180/8.7
(58) Field of Classification Search ................... 180/8.1, 180/8.3, 8.4, 8.7; 446/431, 324
See application file for complete search history.

(56) References Cited

U.S. PATENT DOCUMENTS

| | | | | |
|---|---|---|---|---|
| 3,106,397 A | * | 10/1963 | Lacey | 473/571 |
| 3,672,458 A | * | 6/1972 | Mackerle | 180/8.7 |
| 3,734,220 A | | 5/1973 | Smith | |
| 5,351,773 A | | 10/1994 | Yanagisawa | |
| 5,361,186 A | | 11/1994 | Tanie et al. | |
| 5,515,934 A | * | 5/1996 | Davis | 180/8.2 |
| 5,533,921 A | * | 7/1996 | Wilkinson | 446/409 |
| 5,857,892 A | * | 1/1999 | Leadbetter | 446/431 |
| 5,871,386 A | * | 2/1999 | Bart et al. | 446/460 |
| 5,964,639 A | | 10/1999 | Maxim et al. | |
| 5,992,375 A | | 11/1999 | Nagashima | |
| 6,227,933 B1 | * | 5/2001 | Michaud et al. | 446/462 |
| 6,247,546 B1 | | 6/2001 | Spletzer et al. | |
| 6,286,386 B1 | | 9/2001 | Spletzer et al. | |

(Continued)

FOREIGN PATENT DOCUMENTS

DE 2606399 8/1977

(Continued)

OTHER PUBLICATIONS

American Society for Engineering Education, Robots that Keep Going and Going; Connections, Oct. 2003, 9 pages.

(Continued)

*Primary Examiner*—Kevin Hurley
(74) *Attorney, Agent, or Firm*—Harness, Dickey & Pierce, P.L.C.

(57) ABSTRACT

A robotic vehicle having a body with an internal volume. A plurality of extendable legs project outwardly from the body for supporting the body on a surface and for propelling the body, in at least a partial rolling motion, over the surface. A gimbal system is supported within the body. The gimbal system has a support platform that is moveable within at least two non-parallel planes. An actuator is supported on the support platform and is positionable by the gimbal system into different positions to actuate selected ones of the extendable legs, to thus assist in propelling the vehicle.

7 Claims, 8 Drawing Sheets

U.S. PATENT DOCUMENTS

| | | | |
|---|---|---|---|
| 6,414,457 B1 * | 7/2002 | Agrawal et al. | 318/568.12 |
| 6,458,011 B1 * | 10/2002 | Inoue et al. | 446/376 |
| 6,491,119 B1 | 12/2002 | Neu | |
| 6,579,145 B1 * | 6/2003 | Maxim | 446/437 |
| 6,855,028 B2 * | 2/2005 | Siegel | 446/486 |
| 7,165,637 B2 | 1/2007 | Tanielian | |
| 7,327,112 B1 * | 2/2008 | Hlynka et al. | 318/568.12 |
| 2003/0190998 A1 | 10/2003 | Hackworth et al. | |
| 2007/0144798 A1 | 6/2007 | Tanielian | |

FOREIGN PATENT DOCUMENTS

| | | |
|---|---|---|
| DE | 3203146 | 8/1983 |
| EP | GB 2156476 | 10/1985 |
| JP | 62255298 | 11/1987 |
| WO | WO 01/49373 | 7/2001 |

OTHER PUBLICATIONS

Biologically-Inspired Fast Running Robots, http://www.mechatronics.mech.tohoku.ac.jp/research/Kenken/kenken_en.htm, viewed Aug. 4, 2004, 6 pages.

Chandana, Paul; Fumiya, Iida; Raja, Dravid. "Control of Lateral Bounding for a Pendulum Driven Hopping Robot," undated paper, Articial Intelligence Lab, University of Zurich, Switzerland, 8 pages.

Fiorini, Hayati; Heverly, Gensler. "A Hopping Robot for Planetary Exploration," undated paper, Jet Propulsion Laboratory, California Institute of Technology, Pasadena, CA 91109, 6 pages.

Fiorini, Paolo. Innovative Mobility Systems: Hopping Robots, http://robotics.jpl.nasa.gov/people/fiorini/hopbot/homepage.html/viewed Aug. 4, 2004, 3 pages.

http://mathworld.wolfram.com/PlatonicSolid.html, dated Aug. 12, 2004, 7 pages.

Koditschek, D. D. and Buhler, M. Citations: Analysis of a Simplified Hopping Robot, International Journal of Robotics Research, 10(6), http://citeseer.ist.psu.edu/context/63091/0; viewed Aug. 4, 2004, 7 pages.

Sandia National Laboratories, Sandia Hoppers Leapfrog Conventional Wisdom About Robot Mobility; News Release, www.sandia.gov/media/NewsRel/NR2000/hoppers.htm, viewed Aug. 4, 2004, 4 pages.

Stable One-Legged Hopping Robot With a Circular Foot, www.iwr.uni-heidelberg.de/~agbock/people/katja/hopper1.html, viewed Aug. 4, 2004, 2 pages.

Icosahedron, http://www.ul.ie/~cahird/polyhedronmode/icosahed.htm, viewed Aug. 12, 2004, 3 pages.

Iida, Fumiya; Dravid, Raja; and Paul, Chandana. "Design and Control of a Pendulum Driven Hopping Robot," International Conference of Intelligent Robots and Systems, EPFL, Lausanne, Switzerland, Oct. 2002, pp. 2141-2146.

* cited by examiner

ROBOTIC ROLLING VEHICLE APPARATUS AND METHOD

CROSS-REFERENCE TO RELATED APPLICATIONS

This application is generally related in subject matter to U.S. Pat. No. 7,165,637, entitled "Robotic All Terrain Surveyor", to M. Tanielian, issued Jan. 23, 2007, and assigned The Boeing Company, and also to U.S. divisional patent application Ser. No. 11/538,182 filed Oct. 3, 2005, now U.S. Pat. No. 7,434,638, which is a divisional of application Ser. No. 10/981,912 filed Nov. 4, 2004 now U.S. Pat. No. 7,165, 637. Both are hereby incorporated by reference into the present disclosure.

FIELD

The present disclosure relates to vehicles, and more particularly to a propulsion system for a robotic vehicle that enables the vehicle to traverse a ground surface.

BACKGROUND

The statements in this section merely provide background information related to the present disclosure and may not constitute prior art.

Interest in robotic vehicles continues to increase. Examples of robotic vehicles are disclosed in U.S. Pat. No. 7,165,637, entitled "Robotic All Terrain Surveyor", to Tanielian, issued Jan. 23, 2007, and U.S. Patent Publication No. 2007/0144798, published Jun. 28, 2007, which is a divisional application of U.S. Pat. No. 7,165,637. Both of these references are owned by The Boeing Company, and both are hereby incorporated by reference into the present application.

With any form of robotic vehicle, the vehicle's overall weight and mechanical complexity are factors that designers generally seek to minimize. For example, with the robotic surveyor of U.S. Pat. No. 7,165,637, the device includes a plurality of legs that can be extended to help propel the device in a general rolling motion along a desired course. A plurality of actuators may be included to accomplish this, with one actuator being associated with each leg. Thus, if six legs are used, then a minimum of six actuators may be employed; if twelve legs are used then twelve actuators may be employed and so on.

SUMMARY

The present system and method relates to a robotic vehicle that may be made lighter and with fewer electromechanical components than previously developed robotic vehicles.

In one embodiment the vehicle comprises a body defining an internal volume. A plurality of extendable legs project outwardly from the body for supporting the body on a surface and for propelling the body, in at least a partial rolling motion, over the surface. A gimbal system supported within the body has a support platform that is moveable within at least two non-parallel planes. An actuator is supported on the support platform. The actuator can be positioned by the gimbal system such that the actuator can be moved into different positions to actuate selected ones of the extendable legs to assist in propelling the vehicle.

In one specific embodiment the body forms a sphere. In another embodiment the body forms a polyhedron. In these embodiments the extendable legs may be arranged so that a coaxial center line of each leg intersects the geometric center of the body. The gimbal system is used to axially align the actuator with the particular leg to be extended, and then the actuator is actuated which causes the selected leg to extend. The extendable legs each may have a spring that returns the leg to its retracted position when the leg is not being engaged by the actuator. By actuating specific ones of the extendable legs in certain sequences, a general rolling motion of the body may be achieved.

In another specific embodiment the actuator may comprise an electromechanical solenoid type actuator that is controlled by a controller. The controller may be located within the body. The controller may be powered by a suitable compact battery or other power source that is also carried within the body of the vehicle.

Methods for forming a robotic vehicle and for propelling a vehicle are also described.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
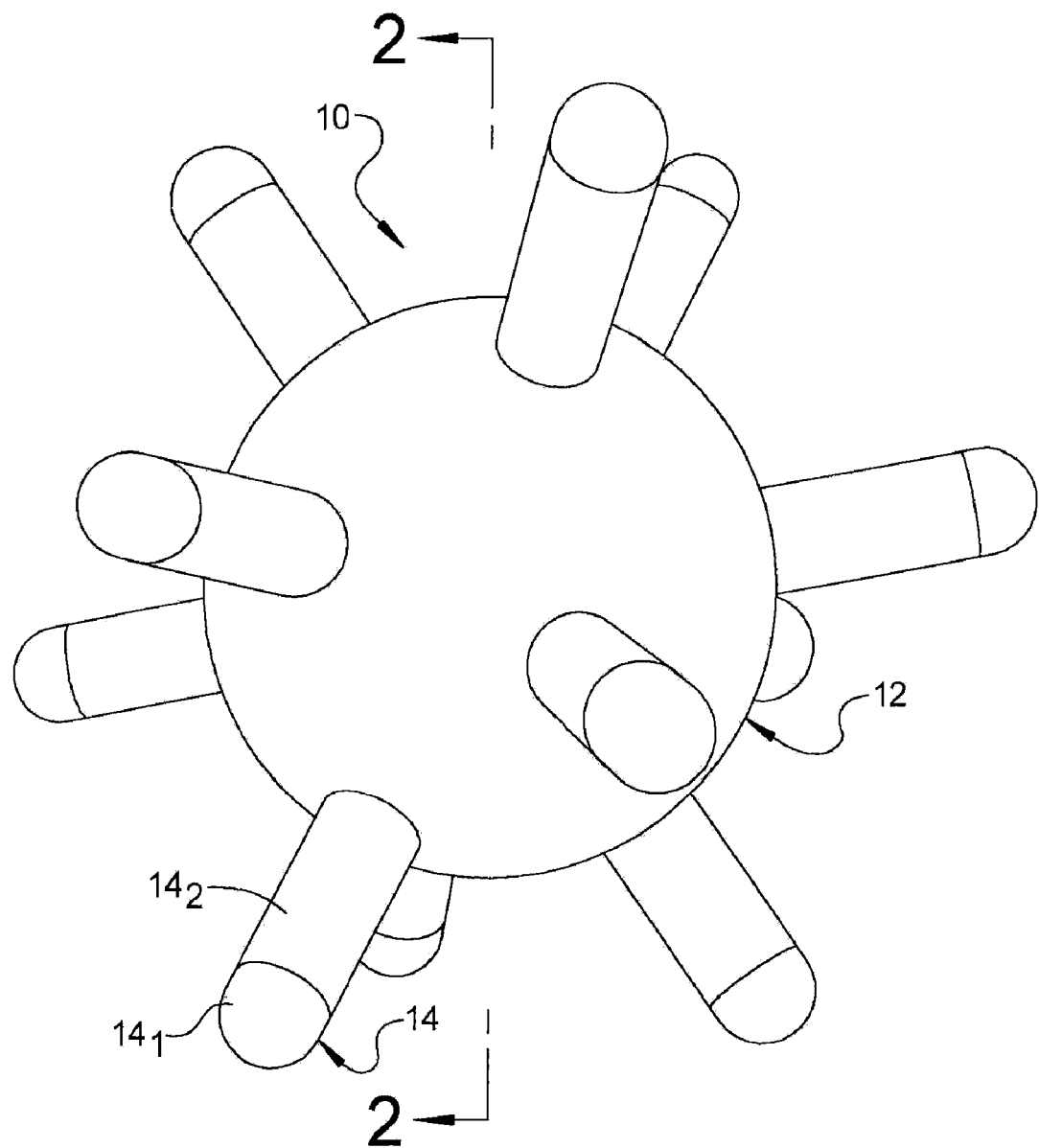
FIG. 1 is a perspective view of one embodiment of a robotic vehicle of the present disclosure.

Referring to FIG. 1, there is shown a robotic vehicle 10 in accordance with one embodiment of the present disclosure. The vehicle 10 in this embodiment includes a spherically shaped body 12 having a plurality of linearly extendable legs 14 supported from, and extending from, the body 12. The legs 14 are further arranged such that a coaxial center line of each leg 14 extends through the geometric center of the body 12. The legs 14 may each be constructed as telescoping assemblies where a telescoping end portion $14_1$ moves relative to a fixed portion $14_2$ that is fixedly supported from the body 12.

Figure 2:
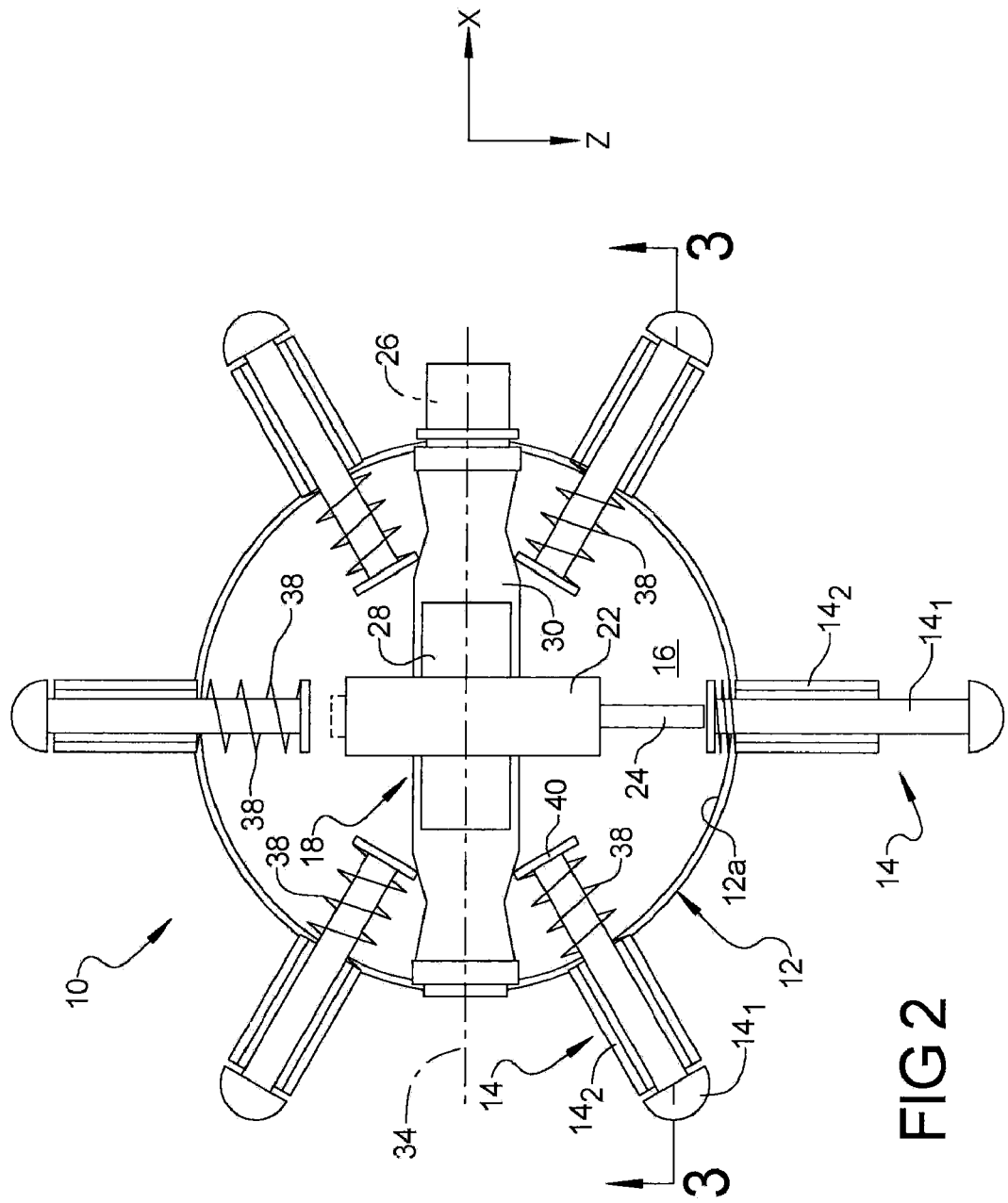
FIG. 2 is 2D representation of the vehicle similar to a cross sectional plan view in accordance with section line 2-2 in FIG. 1, of the interior area of the body of the vehicle of FIG. 1 showing a gimbal system and the actuator supported on a gimbal system.
Figure 3:
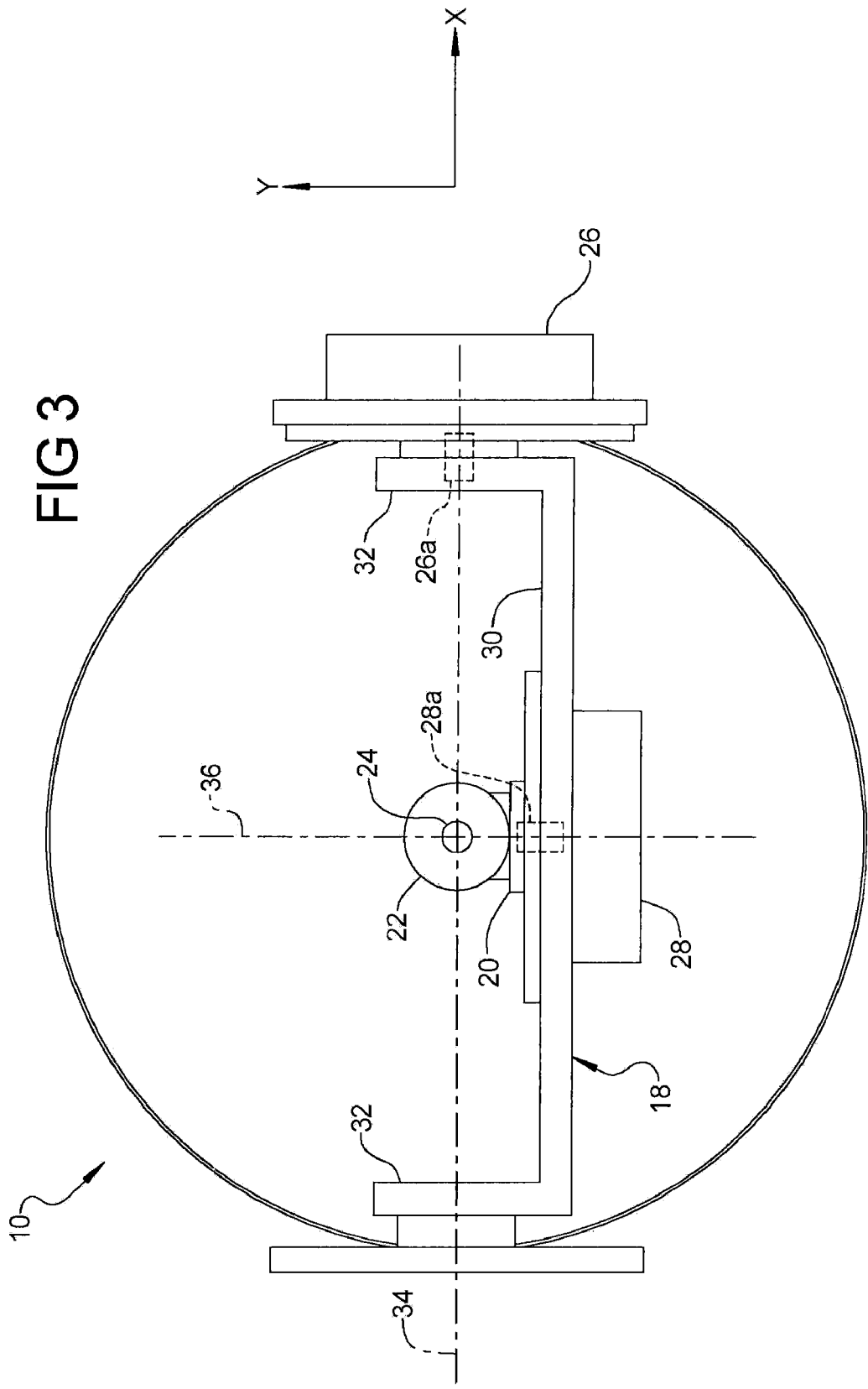
FIG. 3 is a partial side view of the vehicle in FIG. 2 taken in accordance with directional line 3-3 in FIG. 2, and showing a gimbal system and actuator from the side.

Referring to FIGS. 2 and 3, the vehicle 10 can be seen to include a volume 16 within the body 12 defined by an interior surface 12a of the body 12. Mounted within the body 12 is two-axis gimbal system 18 having a support platform 20. Mounted on the support platform 20 is an actuator 22. In one form the actuator 22 may comprise an electromechanical solenoid actuator having a linearly extendable and retractable rod 24. In an alternative form the actuator 22 could comprise a linear motion servo motor, a threaded screw drive, air cylinder, or any suitable component able to move an element linearly into contact with an aligned one of the legs 14.

In FIG. 2, the gimbal system 18 can be seen to include an X-axis servo motor 26, which has an output shaft 26a connected to the support platform 20 In FIG. 3, the gimbal system 18 also can be seen to include a Y-axis servo motor 28 which has its own output shaft 28a. The servo motors 26 and 28 are supported from a frame element 30 that is pivotally mounted at portions 32 of the frame element 30, in part by the servo output shaft 26a, to enable pivoting movement about a first (or "X") axis 34, and also about a second (or "Y") axis 36. Thus, the gimbal system 18, and particularly the servo motors 26 and 28, can be used to position the actuator 22 in a plurality of different non-parallel planes. More particularly, the gimbal system 18 can be used to position the rod 24 of the actuator 22 in longitudinal alignment with the coaxial center line of any one of the extendable legs 14.

When the actuator 22 is actuated by a suitable signal (typically an electrical signal), the rod 24 is extended. The actuator 22 may be designed such that the rod 24 is retracted automatically (for example by an internal spring) when the electrical signal is removed from the actuator 22. Alternatively, the rod 24 may be retracted via a different electrical signal applied to the actuator 22, for example a signal of different polarity from that used to extend the rod 24. Both arrangements are viewed as being within the purview of the present disclosure. The rate of extension and/or retraction of the rod 24 (e.g., centimeters per second) can be tailored through selection of various mechanical properties of the actuator as well as through tailoring of the electrical signal (e.g., magnitude, frequency, duty cycle, etc.) applied to the actuator 22.

With further reference to FIG. 2, each extendable leg 14 includes a biasing element 38 that is captured between the internal surface 12a of the body 12 and a shoulder 40 of each extendable leg. The biasing element 38 in this example is a coil spring, but it will be appreciated that other forms of biasing elements (e.g., leaf springs) could be substituted for use as well with only minor modifications to the structure of the extendable legs 14.

In FIGS. 2 and 3, while the X-axis servo motor 26 is shown supported outside of the body 12, it will be appreciated that it could just as readily be supported within the body if desired. This could be accomplished by suitable bracing, mounting struts or other like structure disposed within the volume 16 inside the body 12 that enables the gimbal frame element 30 to rotate about the X-axis 34.

Figure 4:
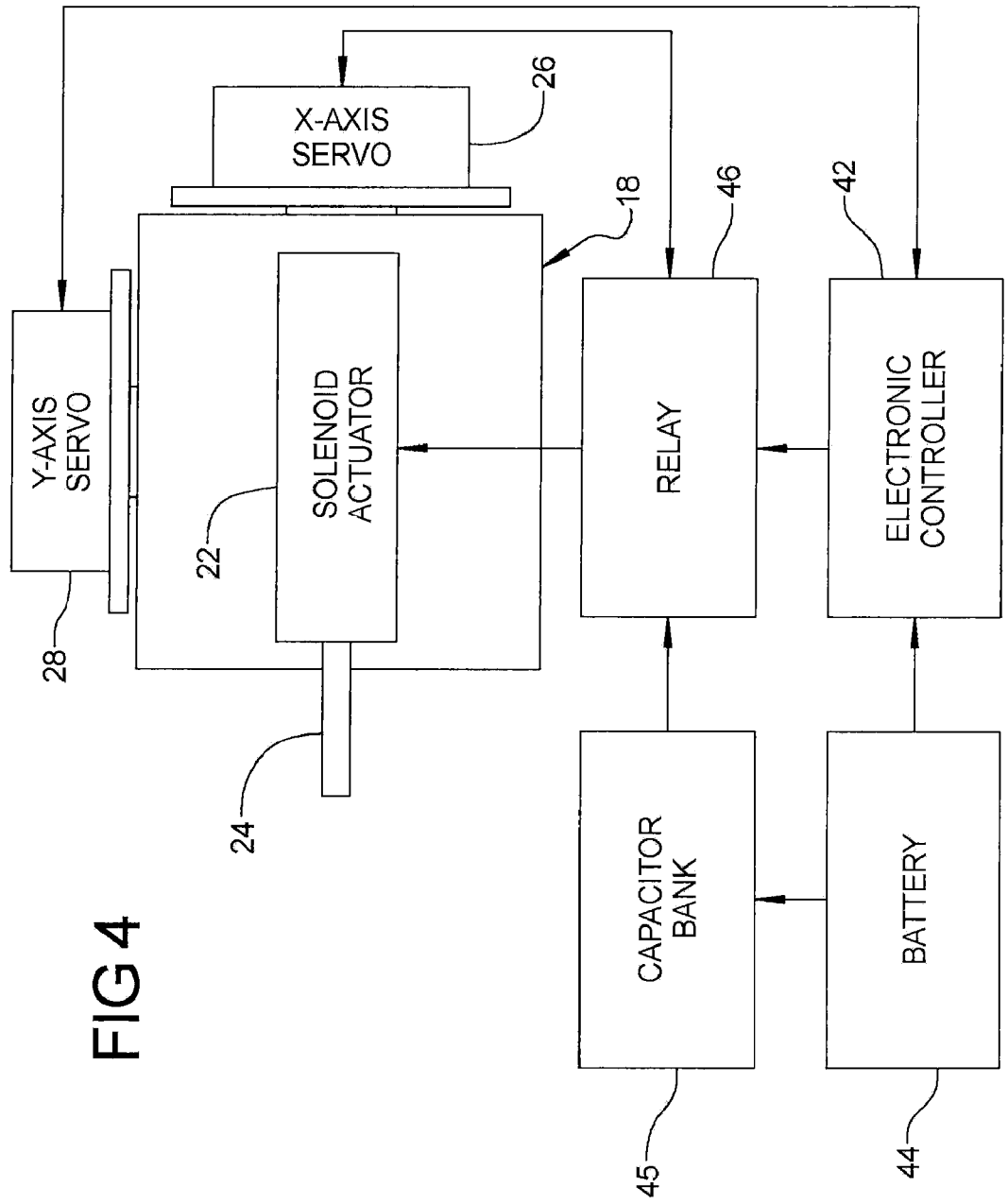
FIG. 4 is a simplified electrical block diagram illustrating major electrical and electromechanical components of the vehicle of FIG. 1.

Referring briefly to FIG. 4, a block diagram of a control scheme for controlling the gimbal system 18 is shown. An electronic controller 42, for example a programmable controller, a microprocessor or microcontroller, may be used to generate the electrical signals needed to control the X-axis servo motor 26 and the Y-axis servo 28 motor. The controller 42 may also be used to generate the signals needed to extend and retract then rod 24 of the actuator 22, or alternatively a separate controller (not shown) could be used to perform this task. In one embodiment, the controller 42 provides power to the solenoid actuator 22 by discharging a capacitor bank 45 through a relay 46. It will be appreciated that, while not shown, suitable amplifiers will typically also be used and controlled by the controller 42 to generate the needed drive signals for the X-axis and Y-axis servo motors 26 and 28, respectively. A battery 44 may be used to power the controller 42 and to provide the current needed to generate the drive signals for the X-axis and Y-axis servo motors 26 and 28. Optionally, the controller 42 may be interfaced with a miniature RF receiver or transceiver (not shown) housed within the body 12 to enable an external (i.e., remotely located) control system to control operation of the vehicle 10.

Figure 5:
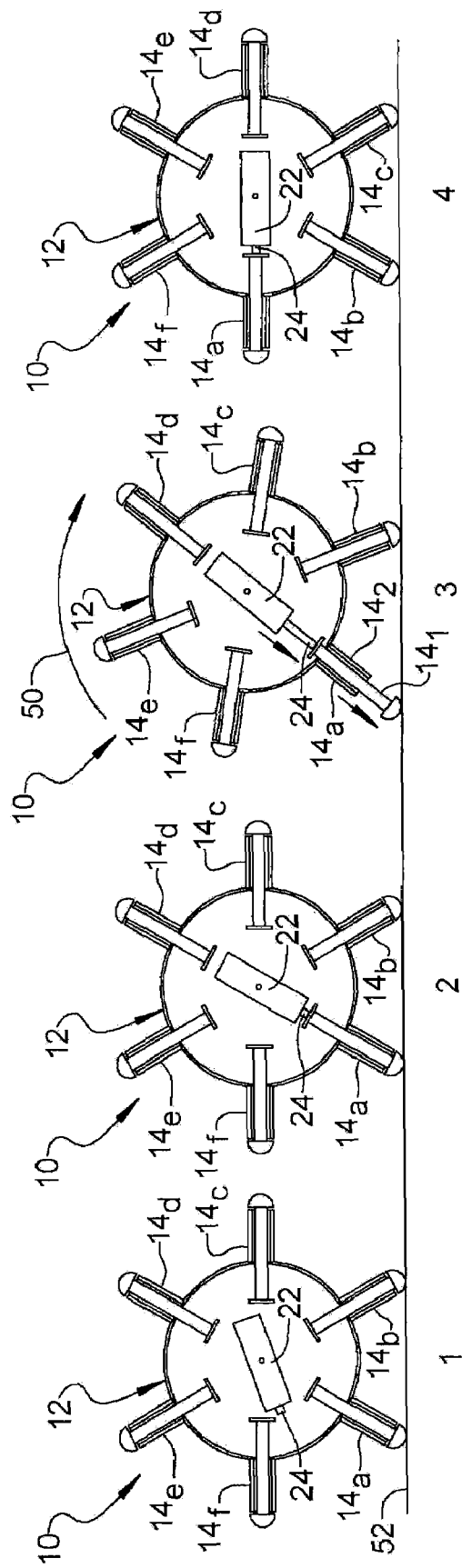
FIGS. 5A-5D illustrates a sequence where the actuator is moved into alignment with different ones of the extendable legs so that a general rolling motion can be imparted to the vehicle.

Referring to FIGS. 5A-5D, operation of the vehicle 10 will be described. For example, if motion in the general direction of arrow 50 is desired, then leg 14a will need to be actuated, as this leg presently one of the legs 14 supporting the vehicle 10 on a ground surface 52. The gimbal system 18 is controlled to align the actuator 22 with the coaxial center line of leg 14a, as shown in FIG. 5B. The actuator 22 is then actuated by the controller 42 which causes rod 24 to extend. This extending movement enables the rod 24 to extend portion $14_1$ of actuator 14a, which imparts a rolling motion to the vehicle 10. The impulse provided by the rapid extension of the actuator rod 24 should be sufficient to cause the body 12 of the vehicle 10 to roll over the immediately adjacent leg (in this example leg 14b) along the generally desired path of travel. It will be appreciated that by "generally" desired path of travel, it is meant that the vehicle 10 will have somewhat of a side-to-side travel, or what could be viewed as a general "zig-zag" path of travel, as it moves in a given direction.

In FIG. 5D, the body 12 is now supported by at least legs 14b and 14c, but typically at least one additional leg (not shown in FIGS. 5A-5B) will be arranged so that the body 12 is supported by three of the legs 14 when at rest. Continued movement in the general direction of arrow 50 would next require extension of leg 14b. The actuator 22 would then be repositioned by the controller 42 using the gimbal system 18 to coaxially align the actuator rod 24 with leg 14b, and the above-described operation of extending and retracting the rod 24 would be repeated.

The motion sequence in FIGS. 5A-5D produces one type of rolling locomotion, but others are also possible with this type of actuation. For example, if the leg actuator is capable of higher thrust (due to higher velocity motion of the extension rod 24), then a hopping type of locomotion can be produced.

Figure 6:
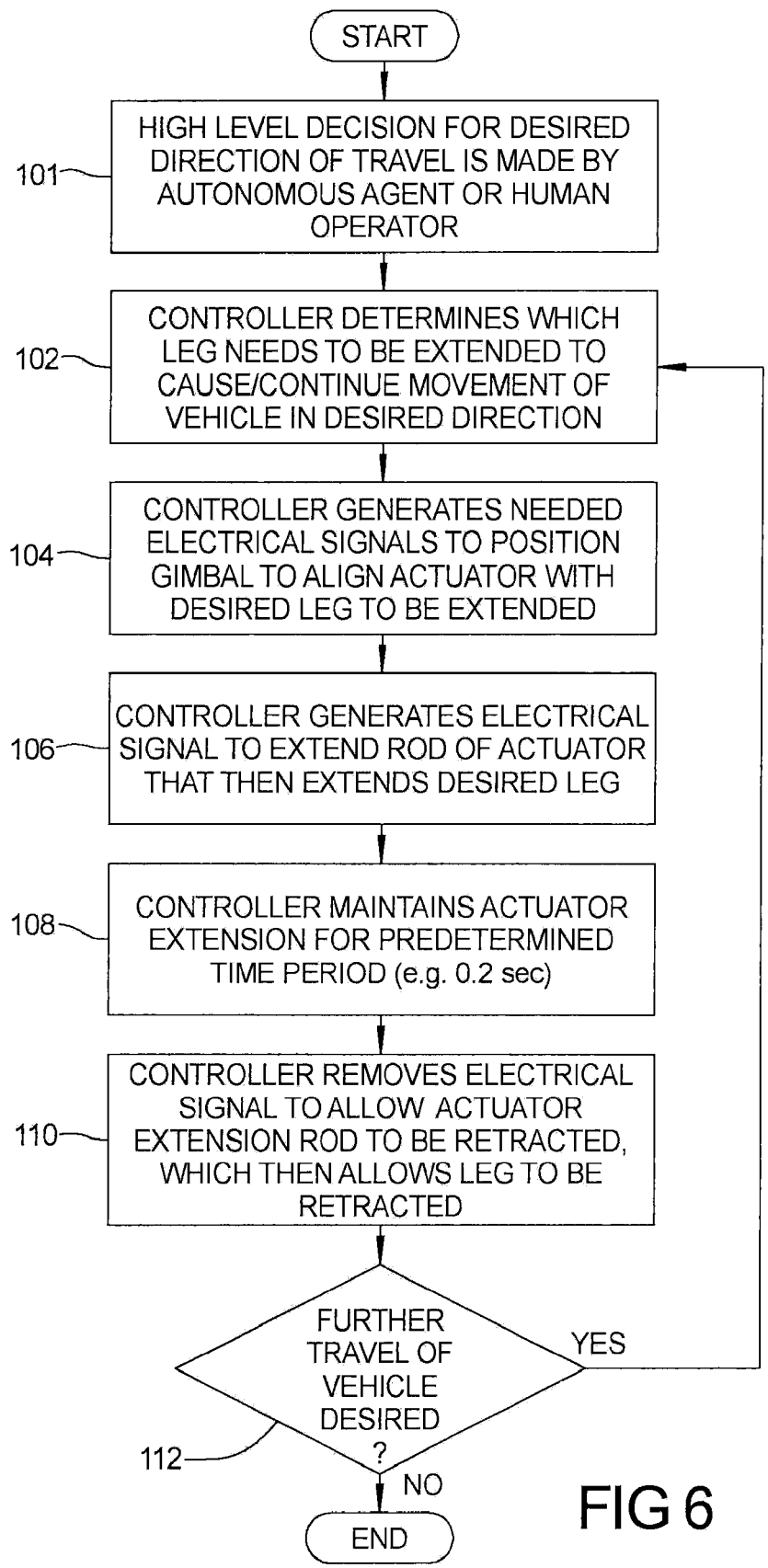
FIG. 6 is a flowchart illustrating several operations performed in causing motion of the vehicle of FIG. 1.

FIG. 6 illustrates a flowchart 100 illustrating operations for controlling motion of the vehicle 10. At operation 101, a high level decision is made by an autonomous planner or human operator as to the desired direction of travel. At operation 102, the controller 42 determines which leg 14 needs to be actuated to propel the vehicle 10 in the desired direction. At operation 104 the controller 42 generates the needed electrical signals to drive the X-axis servo motor 26 and the Y-axis servo motor 28 so that the actuator 22 is positioned in axial alignment with the leg 14 to be actuated. At operation 106 the controller 42 then generates the required electrical signal to actuate the actuator 22 and extend the rod 24, thus causing extension of the selected leg 14. At operation 108, the controller 42 maintains the selected leg 14 actuated (i.e., maintains the rod 24 extended) for a predetermined time period, which is typically less than 1 second. The body 12 of the vehicle 10 will roll to a new position as the selected leg 14 is fully extended.

At operation 110, after the predetermined time period expires, the controller 42 removes the electrical signal from the actuator 22 to enable the rod 24 of the actuator 22 to be retracted, and thus to enable the extendable portion $14_1$ of the selected leg 14 to be retracted by its associated coil spring 38. At operation 112 the controller 42 determines if further travel of the vehicle 10 is desired and, if not, the sequence of operation terminates. If operation 112 determines that further travel of the vehicle 10 is required, then a loop is made back to operation 102, and operations 102-112 are repeated. Again, it will be appreciated that as different ones of the legs 14 are actuated, the that the vehicle 10 will be propelled in the desired direction (albeit in a somewhat zig-zag fashion). Suitable software or firmware may be included for use with the controller 24 to monitor the position of the body 12 relative to the ground surface 52, and to determine precisely which leg 14 needs to be actuated next to propel the vehicle 10 in the desired direction. Obviously, any suitable orientation/attitude sensing system may be used in connection with the controller 42 to continuously monitor the orientation of the body 12 relative to the ground surface 52 so that the controller may determine exactly which leg 14 needs to be extended next to effect (or continue) motion of the vehicle 10 in the desired direction. Determination of which legs are in contact can performed by analyzing the state of contact switches that may be attached to the feet of the extension legs. Other options include using sensors that can determine the angular orientation of the vehicle; these types of sensors may include inclinometers (such as the dual-axis inclinometers made by VTI Technologies of Dearborn, Mich.) or inertial measurement units (such as the IMUs made by Cloud Cap Technology, Inc. of Hood River, Oreg.).

Figure 7:
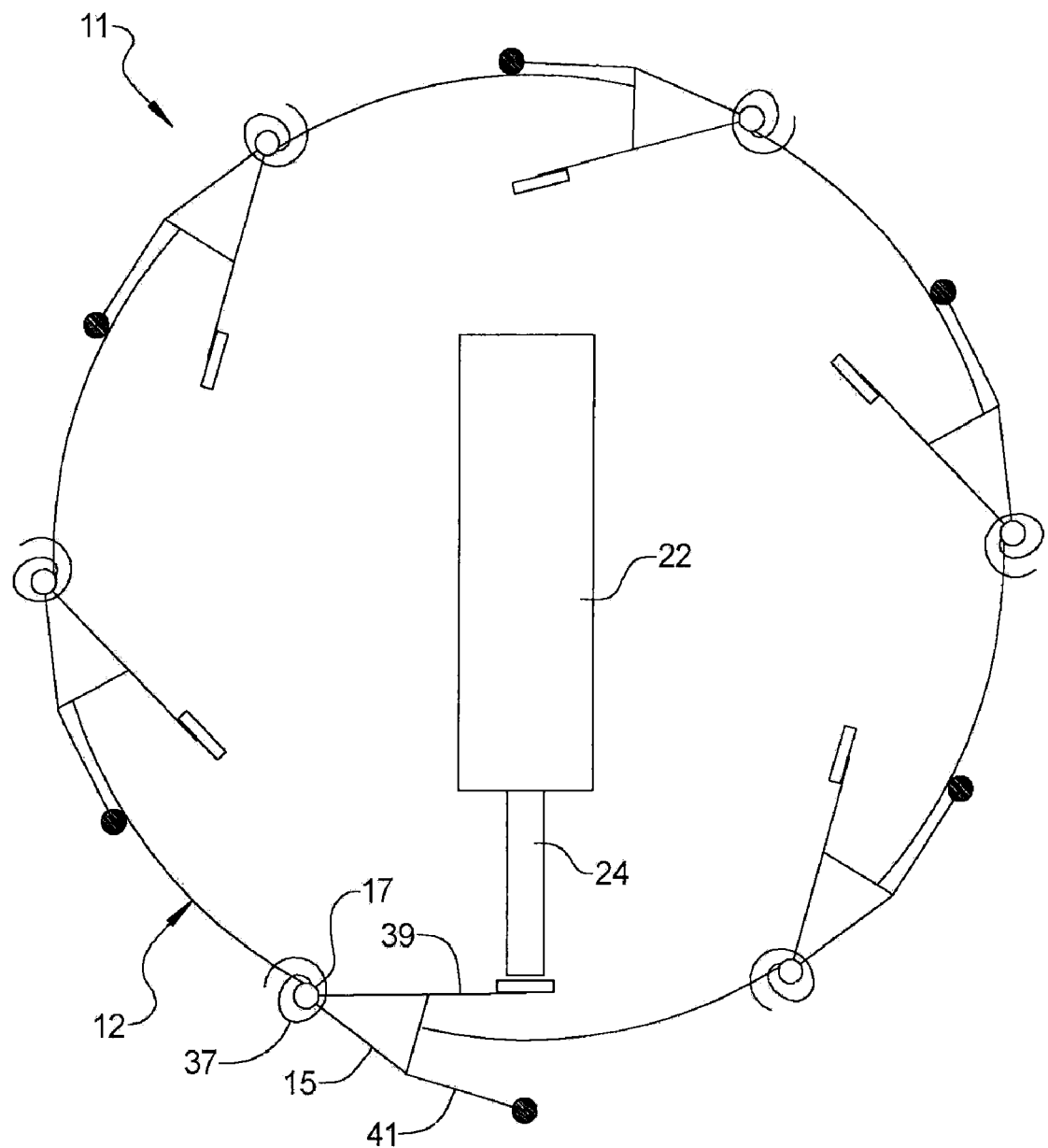
FIG. 7 is another embodiment of the vehicle in which pivoted legs are used to transmit thrust from the centrally mounted actuator to the ground.

FIG. 7 illustrates an alternate embodiment of the vehicle. In this embodiment (vehicle 11), the legs 15 extend from the body by pivoting about hinge 17, instead of telescoping. Each leg element consists of an internal transfer element 39 rigidly connected to an external extension element 41, which makes contact with the ground. Each leg 15 is returned or held in the retracted position by a torsional spring 37. The method of actuation and locomotion is the same as that of the telescopic leg embodiment of the vehicle 10 described above. This pivoting leg modification may prove to be easier to manufacture for some types of vehicles.

Figure 8A:
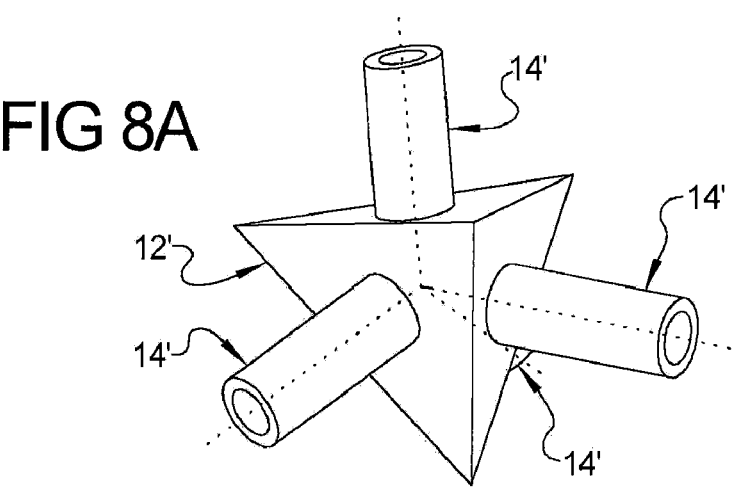
FIGS. 8A and 8B show perspective views of other embodiments of the vehicle that employ polyhedron shaped bodies.
Figure 8B:
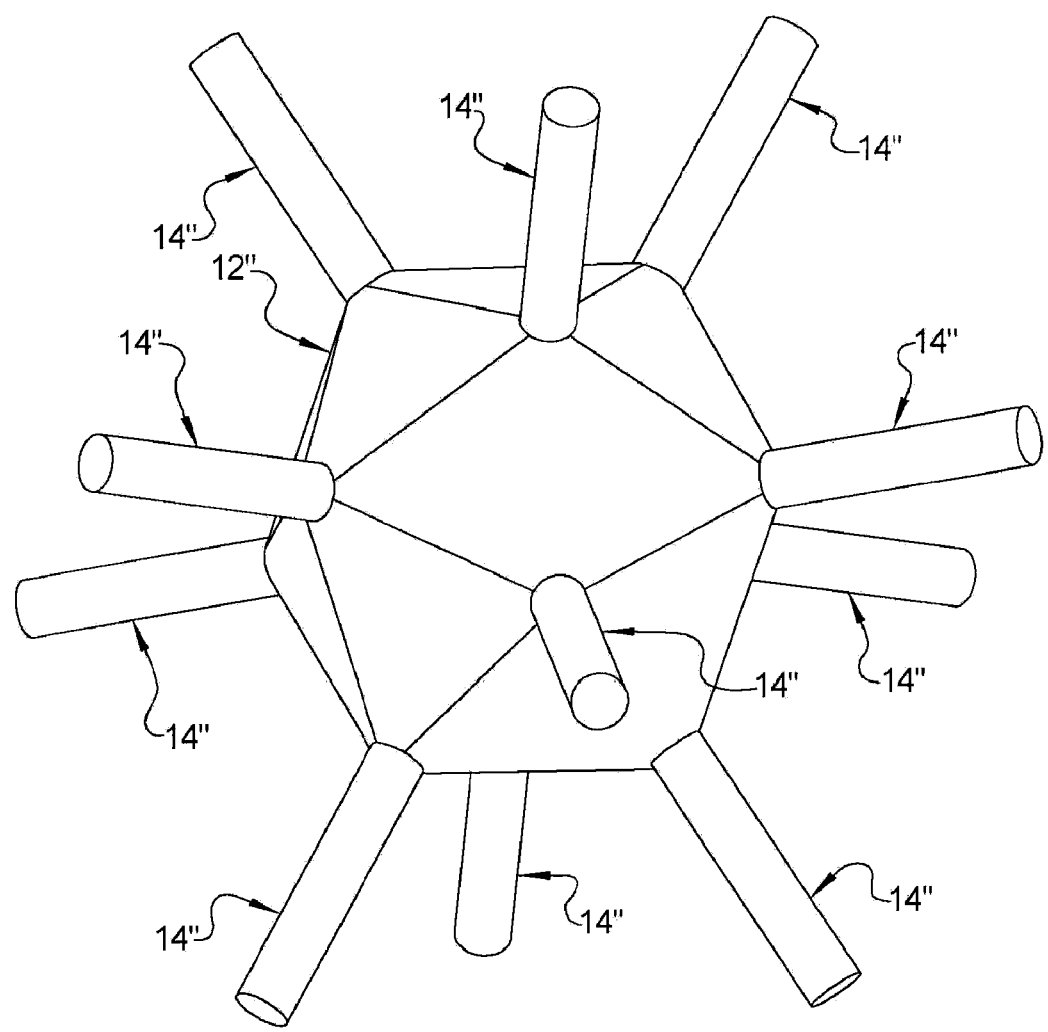

For the above-described embodiments, it will be appreciated that while the body 12 is shown shaped as a sphere, that the body could just as readily take the shape of a tetrahedron (FIG. 8A), icosahedron (FIG. 8B), or other form of polyhedron. The precise shape of the body 12 may dictate how many legs can be used on the body. For example, a pyramid (tetrahedron) shaped body 12', as shown in FIG. 8A, may permit the use of four legs 14' (only three being visible), while an icosahedron shaped body 12" may permit the use of twelve legs 14" (one at each of its twelve vertices). Obviously, the greater the number of legs used, the greater the degree of precision that will be available in causing the vehicle 10 to follow a desired path. Also, depending on the selected body shape, the lengths of the extendable legs 14 may need to be slightly increased or decreased. Generally speaking, the closer the outward shape of the body 12 is to that of a sphere, the lower the amount of leg thrust needed to cause locomotion of the vehicle.

The various embodiments of the vehicle 10 enable a single actuator to be used to selectively extend virtually any number of independently extendable legs. By using a single actuator and a gimbal system to position the actuation in the various non-parallel planes needed to align the actuator with different legs, a significant weight savings can be achieved. The overall complexity of the system may also be reduced through the use of only a single actuator. In essence, the greater the number of legs employed with the vehicle, the greater the weight and cost savings is likely to become by using only a single actuator.

It will be appreciated that various modifications could be made to the system and method described herein without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for forming a robotic vehicle comprising:
   forming a body defining a volume therewithin;
   arranging a plurality of extendable legs to project from said body for supporting said body on a surface and for propelling said body, in at least a partial rolling motion, over said surface;
   supporting a support platform within said body for movement within at least two different non-parallel planes; and
   using an actuator mounted on said support platform to selectively engage said extendable legs to cause said extendable legs to be extended, to assist in causing a generally rolling motion of said body.

2. The method of claim 1, wherein said extendable legs are sequentially actuated one at a time.

3. The method of claim 1, wherein supporting a support platform within said body for movement within at least two different non-parallel planes comprises using a gimbal system to support said support platform to enable movement of said support platform within more than two non-parallel planes.

4. The method of claim 1, wherein arranging a plurality of extendable legs to project from said body comprises arranging a plurality of extendable legs to project from said body such that a coaxial center line of each said extendable leg extends through a geometric center of said body.

5. The method of claim 1, wherein forming a body comprises forming a body shaped as a sphere.

6. The method of claim 1, wherein forming a body comprises forming a body shaped as a polyhedron.

7. The method of claim 1, wherein arranging a plurality of extendable legs comprises arranging a plurality of extendable legs that each have a biasing element associated therewith for maintaining each said extendable leg in a normally retracted orientation.

* * * * *

UNITED STATES PATENT AND TRADEMARK OFFICE
CERTIFICATE OF CORRECTION

PATENT NO.         : 7,490,681 B2                                    Page 1 of 1
APPLICATION NO. : 11/951728
DATED              : February 17, 2009
INVENTOR(S)        : James J. Troy It is certified that error appears in the above-identified patent and that said Letters Patent is hereby corrected as shown below:

Title Page: under Item (62), Related U.S. Application Data should read:
    This application No. 11/538,182, filed October 3, 2006 (now U.S. Pat. No. 7,434,638), which is a division of 10/981,912, filed November 4, 2004 (now U.S. Pat. No. 7,165,637).

Signed and Sealed this

Thirteenth Day of October, 2009

David J. Kappos
*Director of the United States Patent and Trademark Office*

UNITED STATES PATENT AND TRADEMARK OFFICE
CERTIFICATE OF CORRECTION

PATENT NO.        : 7,490,681 B2
APPLICATION NO.   : 11/951728
DATED             : February 17, 2009
INVENTOR(S)       : James J. Troy It is certified that error appears in the above-identified patent and that said Letters Patent is hereby corrected as shown below:

Title Page: under Item (62), Related U.S. Application Data should read:
    This application is generally related in subject matter to 11/538,182, filed October 3, 2006 (now U.S. Pat. No. 7,434,638), which is a division of 10/981,912, filed November 4, 2004 (now U.S. Pat. No. 7,165,637).

This certificate supersedes the Certificate of Correction issued October 13, 2009.

Signed and Sealed this

Fifteenth Day of December, 2009

David J. Kappos
*Director of the United States Patent and Trademark Office*